US010645108B2

(12) United States Patent
Kurian

(10) Patent No.: US 10,645,108 B2
(45) Date of Patent: May 5, 2020

(54) SMART INTERNET OF THINGS ("IOT") WEB OF TRUST

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 266 days.

(21) Appl. No.: 15/924,651

(22) Filed: Mar. 19, 2018

(65) Prior Publication Data

US 2019/0289026 A1   Sep. 19, 2019

(51) Int. Cl.
*H04L 29/06* (2006.01)
(52) U.S. Cl.
CPC ...... *H04L 63/1425* (2013.01); *H04L 63/1416* (2013.01); *H04L 63/1441* (2013.01)
(58) Field of Classification Search
CPC ............ H04L 63/1425; H04L 63/1441; H04L 63/1416
See application file for complete search history.

(56) References Cited

U.S. PATENT DOCUMENTS

| 9,319,404 | B2 | 4/2016 | Svigals |
| 9,485,231 | B1 | 11/2016 | Reese |
| 9,536,072 | B2 * | 1/2017 | Guedalia ............... G06F 21/316 |
| 9,565,192 | B2 | 2/2017 | Chillappa et al. |
| 9,591,016 | B1 | 3/2017 | Palmieri et al. |
| 9,699,659 | B2 | 7/2017 | Zehavi et al. |
| 9,699,814 | B2 | 7/2017 | Zakaria et al. |
| 9,716,595 | B1 | 7/2017 | Kravitz et al. |
| 9,729,528 | B2 | 8/2017 | Zakaria et al. |
| 9,825,921 | B2 | 11/2017 | Reese |

(Continued)

OTHER PUBLICATIONS

"Securing the Internet of Things: A Proposed Framework," https://www.cisco.com/c/en/us/about/security-center/secure-iot-proposed-framework.html, Mar. 16, 2016.

(Continued)

*Primary Examiner* — Lynn D Feild
*Assistant Examiner* — Viral S Lakhia
(74) *Attorney, Agent, or Firm* — Weiss & Arons LLP; Michael A. Springs, Esq.

(57) ABSTRACT

Apparatus and methods are provided for tracking and validating behavior and communication patterns of sensors connected to an Internet-of-Things ("IoT") network. Preferably, trusted IoT sensors monitor communication patterns exhibited by other trusted and/or untrusted sensors. An untrusted monitored sensor may be assigned a trusted status based on applying artificial intelligence and/or machine learning algorithm to monitored and/or historical communication patterns exhibited by the monitored sensor. A trusted group of sensors may continue to grow by adding other trusted sensors. If a compromised sensor is detected, a silo may be erected around the compromised sensor. The silo may include disconnecting the compromised sensor from the network. After erecting the silo, communication patterns exhibited by the compromised sensor may be continue to be monitored. After a pre-determined time period the compromised sensor may be reassigned a trusted status or purged from the trusted group and/or network.

16 Claims, 5 Drawing Sheets

(56) References Cited

U.S. PATENT DOCUMENTS

| | | | |
|---|---|---|---|
| 9,875,510 B1 | 1/2018 | Kasper | |
| 9,967,173 B2* | 5/2018 | Gross | H04L 45/74 |
| 9,979,606 B2* | 5/2018 | Gupta | H04L 41/14 |
| 10,251,053 B1 | 4/2019 | Paczkowski et al. | |
| 10,257,165 B2* | 4/2019 | Obaidi | H04W 4/80 |
| 10,511,602 B2* | 12/2019 | Siwal | H04W 4/70 |
| 2015/0195296 A1* | 7/2015 | Vasseur | H04L 43/0876 726/23 |
| 2016/0173495 A1 | 6/2016 | Joo | |
| 2016/0248746 A1 | 8/2016 | James et al. | |
| 2016/0259937 A1 | 9/2016 | Ford et al. | |
| 2016/0260095 A1 | 9/2016 | Ford | |
| 2016/0337127 A1 | 11/2016 | Schultz et al. | |
| 2016/0366181 A1 | 12/2016 | Smith et al. | |
| 2017/0061131 A1* | 3/2017 | Santos | G06F 21/577 |
| 2017/0126734 A1* | 5/2017 | Harney | H04L 61/2069 |
| 2017/0163444 A1 | 6/2017 | McLaughlin et al. | |
| 2017/0289184 A1 | 10/2017 | C et al. | |
| 2018/0198818 A1* | 7/2018 | Andrews | H04L 69/22 |
| 2018/0253451 A1 | 9/2018 | Callan et al. | |
| 2018/0337769 A1* | 11/2018 | Gleichauf | G06Q 20/29 |
| 2019/0138716 A1* | 5/2019 | Huang | G06F 21/645 |
| 2019/0172566 A1 | 6/2019 | Schulman et al. | |
| 2019/0230063 A1* | 7/2019 | McCready | H04W 12/0609 |
| 2019/0289454 A1 | 9/2019 | Inoue | |
| 2019/0349190 A1 | 11/2019 | Smith et al. | |
| 2019/0349426 A1* | 11/2019 | Smith | H04W 4/08 |

OTHER PUBLICATIONS

"Global Hacker Botnet tops 6 million hijacked devices," http://www.computerweekly.com/news/450427023/Global-hacker-botnet-tops-6-million-hijacked-devices, Sep. 27, 2017.

Conoscenti et al., "Peer to Peer for Privacy and Decentralized in the Internet of Things," 2017, IEEE, pp. 288-290. (Year: 2017).

* cited by examiner

SMART INTERNET OF THINGS ("IOT") WEB OF TRUST

FIELD OF TECHNOLOGY

This disclosure relates to a security framework that overcomes technical challenges of securing on an Internet of Things ("IoT"). Specifically, this disclosure relates to a security framework for devices connected to an IoT that have non-uniform and possibly incompatible hardware and software components.

BACKGROUND

An IoT may be defined as "a pervasive and ubiquitous network which enables monitoring and control of the physical environment by collecting, processing, and analyzing the data generated by sensors or smart objects." Securing the Internet of Things: A Proposed Framework, Jazib Frahim, Carlos Pignataro, Jeff Apcar and Monique Morrow, Published by Cisco Security Research & Operations and available at: https://www.cisco.com/c/en/us/about/security-center/secure-iot-proposed-framework.html.

Examples of such sensors or smart objects include refrigerators, lights, smartphones, smartwatches, computers, laptops, tablets, sinks, hot water heaters, coffee machines, ovens, vehicles, thermostats and any other suitable devices.

Interconnected sensors may gather data. The diverse nature and large volume of data collected by interconnected sensors on an IoT potentially provides unique functionality and operational opportunities. Computing systems may process the gathered data and derive new knowledge or insights from the data. The new knowledge may be leveraged to provide feedback to the sensors or proactive instructions to other sensors, thereby improving the efficiency and intelligence of the sensors. Exemplary effects of improved efficiency and intelligence may be recognized by optimizing processes, improving understanding and targeting of customer needs and increasing automation and decreasing latency in provision of products and services.

In an IoT, each of the interconnected sensors may not have uniform computing capabilities or known network positions, communication protocols or security services. Furthermore, IoT connected devices may not be centrally controlled. Accordingly, the unstructured and diverse nature of an IoT poses a technical challenge to detecting when an IoT connected sensor has been compromised.

Furthermore, for IoT connected devices to be utilized for transmission of sensitive information or other applications that require a threshold level of security or performance. Sensitive information may include personally identifiable information or financial information. The unstructured and diverse nature of an IoT also poses a technical challenge to securing devices or communication pathways for transmission of sensitive information.

To solve these technical challenges, it would be desireable to provide solutions that allow non-uniform and interconnected IoT sensors to function seamlessly and securely and leverage the distributed efficiency and intelligence capabilities provided by an IoT. Therefore, it is desirable to provide a communications system for securing a data transmission path prior to data transmission is desirable.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
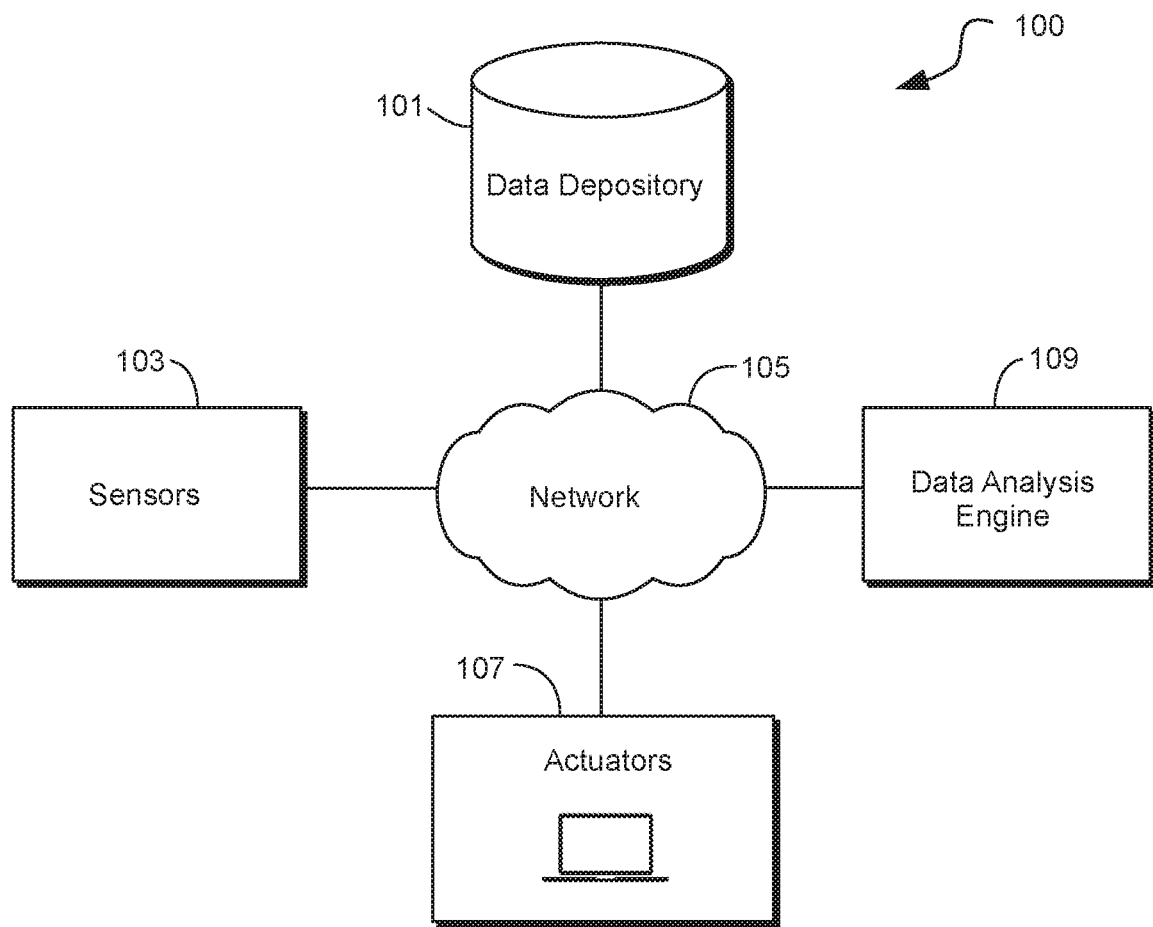
FIG. 1 shows an illustrative system architecture in accordance with principles of the disclosure.

Apparatus and methods for tracking and validating behavior and patterns of devices connected to an Internet-of-Things ("IoT") are provided. In a preferred embodiment, known or trusted devices on the IoT vouch for a trusted status of other devices or networks (collectively, "nodes"). "Vouching" for another device may include assigning a trusted status to the other device. A trusted device may add additional devices to the IoT. The IoT may grow by assigning a trusted status to any number of devices.

To establish a device as a trusted device, an electronic communication pattern exhibited by the device may be monitored. Electronic communication patterns of the device among three or more devices in the trusted group may be monitored for a predetermined time period.

A trusted status may be assigned to a device based on one or more considerations. A trusted status may be assigned on applying artificial intelligence and/or machine learning algorithms to communication patterns exhibited by a device. Devices having a trusted status may establish electronic trust with a new device based on applying a machine learning algorithm to the electronic communication patterns generated by the new device. The machine learning algorithm may learn based on associating electronic communication patterns with responsive actions of the new device.

A target device may be classified as being compromised. A target device may be classified as compromised when it is associated with a malicious electronic communication pattern. A target device may be classified as compromised when a security breach or malicious electronic communication pattern is detected in a geographic location where the device resides.

A malicious communication pattern may include transmitting/receiving information associated with a known computer virus. A malicious communication pattern may include transmitting/receiving communications that deviate from historical communication patterns exhibited by a device. A malicious communication pattern may include transmitting/receiving instructions and/or information beyond the scope of expected activity or expected functionality of the device.

When a target device is classified as compromised, a silo may be erected around the target device. Erecting the silo may include "unhooking" the device from the IoT. Unhooking the device from the IoT may correspond to disconnecting the device from the IoT. The compromised target device may be permanently banned from reconnecting to the IoT. The compromised target device may be banned from accessing the IoT by blacklisting the target device.

A network gateway may circulate identities of "blacklisted" devices. The network gateway may push the identities of blacklisted devices to one or more devices on the IoT. The network gateway may route communications on behalf of one or more devices on the IoT. In such embodiments, the network gateway itself may determine whether a device transmitting or receiving information is blacklisted.

Devices may be identified on the IoT by one or more radio frequency identification ("RFID") tags. The RFID tag may be stimulated to transmit identity information about the device or any other information stored on the RFID tag. Devices may be identified by an addressing scheme such as an internet protocol ("IP") addressing scheme. Illustrative IP addressing schemes include IPv4 (32 bit addresses) and IPv6 (128 bit addresses).

A compromised target device may be unhooked from the IoT for an indefinite amount of time. The compromised target device may be unhooked from the IoT for a quarantine period. After expiration of the quarantine period the compromised target device may be reassigned a trusted status. After expiration of the quarantine period the compromised target device may retain a compromised status. After expiration of the quarantine period the compromised target device may be reconnected to the IoT.

Apparatus may include a centralized system for tracking communication behavior of a target device on an IoT. The target device may be any suitable node or network. The system may include a trusted group of devices connected to the IoT. The trusted group may include the target device. The system may include a network gateway. The network gateway may be configured to track a position of the target device on the IoT. A position of a device on the IoT may be defined based on a time the device joined the trusted group. A position of a device on the IoT may be defined based on a time the device is assigned a trusted status.

The network gateway may add one or more devices to the trusted group. Adding a device to the trusted group may correspond to assigning a trusted status to the newly added device. The network gateway may monitor electronic communication patterns among devices in the trusted group. The network gateway may detect an electronic communication pattern exhibited by the target device that corresponds to a malicious communication pattern. An electronic communication pattern exhibited by the target device may correspond to known profile or known activity associated with a malicious communication pattern.

In response to detecting a malicious communication pattern, the network gateway may shift a position of the target device within the trusted group. The network gateway may initiate an observation period after shifting the position of the target device.

During the observation period, the network gateway may monitor electronic communication patterns generated by the target device. During the observation period, when the monitored electronic communication patterns associated with the target sensor exemplify a malicious communication pattern, the network gateway may initiate a quarantine period. During the observation period, when an electronic communication pattern associated with the target sensor exemplifies a malicious communication pattern, the network gateway may erect a silo around the target device. The silo may restrict communication to or from the target device.

For example, when the silo is erected around the target device, other devices on the IoT may follow a predetermined electronic communication pattern when interacting with the target device. A predetermined electronic communication pattern may include imposing timing restrictions on when the target device may communicate with other devices. The predetermined electronic communication pattern may include content restrictions on what the target device may communicate to another device. The predetermined electronic communication pattern may include restrictions on where the target device must be to transmit or receive information.

Imposing a predetermined electronic communication pattern may include limiting commands that may be issued by the target device to other devices on the IoT. Imposing a predetermined electronic communication pattern may include limiting commands that may be transmitted to the target device from other devices on the IoT.

Erecting the silo around the target device may include assigning a "guard" device to the compromised device. The guard device may be positioned "in front" of the target device. When the guard device is positioned "in front" of the target device, communications destined for the target device may first be received or intercepted by the guard device. The guard device may determine whether to pass the received/intercepted communication to the target device.

The guard device may receive/intercept communication transmitted by the target device and destined for another device on the IoT. The guard device may determine whether to pass the received/intercepted communication to the other device.

Erecting a silo around the target device may include trigging a self-cleansing protocol within the target device. For example, the network gateway may trigger a factory-reset of the target device. The network gateway may be configured to trigger a reset such that only settings associated with the malicious communication pattern are reset. In some embodiments, the target device may be given the option of being disconnected from the IoT or a complete and/or limited reset.

The network gateway may erect a silo around a target device by configuring each of the other devices in the trusted group to relay electronic communications received from the target device and destined for one or more devices outside the trusted group without executing any computer executable code received from the target device. Such a silo may limit an ability of the compromised target device to harm or infect other devices within the trusted group.

After expiration of the quarantine period, the network gateway may determine whether the target device exhibited the malicious electronic communication pattern during the quarantine period. When the network gateway detects that the target device exhibited the malicious communication pattern at least once during the quarantine period, the target device may be disconnected from the network or trusted group.

If the target device executes the malicious communication pattern during the quarantine period, the target device may not be curable. The network gateway may monitor for the malicious communication pattern and even before expiration of the quarantine period, the network gateway may disconnect the target device as soon as the malicious communication pattern is detected.

A malicious communication pattern may be associated with information transmitted by a target device. A malicious communication pattern may be associated with information destined for a target device.

The network gateway may reconfigure devices in the trusted group. The network gateway may reconfigure devices in the trusted group such that the network gateway is the sole source of electronic communication between members of the trusted group and the target device.

Disconnecting the target device may include configuring devices in the trusted group such that the target device cannot transfer or receive electronic communications to/from any of the devices in the trusted group.

Erecting the silo around the target device may suspend a trusted status of the target device. During the quarantine period, the target device may remain a member of the trusted group.

After expiration of the quarantine period, the network gateway may determine that the target device did not exhibit a malicious electronic communication pattern at least once during the quarantine period. In response to such a determination, the network gateway may deconstruct the silo erected around the target device. In response to such a determination, the network gateway may reassign a trusted status to the target device.

IoT networks may include an untrusted device. A network gateway may be configured to add the untrusted sensor to the trusted group. The untrusted device may be added to the trusted group based on electronic communication patterns exhibited during communication of the untrusted sensor with at least one device in the trusted group. The untrusted device may be added to the trusted group based on electronic communication patterns exhibited during communication with the untrusted sensor and at least three of more devices in the trusted group for a predetermined time period.

Electronic communication patterns may include expected or typical behavior for a target device. "Typical" behavior may be based on a function of the target device (e.g., refrigerator, thermostat, smart phone). Typical behavior for a target device may be based on a geographic location of the time or a time of day. For example, a device may only be expected to transmit data during nighttime hours in a specific geographic location. If the network gateway detects that the device is transmitting relatively large amounts of data during daytime hours (e.g., consuming excessive bandwidth on the IoT), the network gateway may flag such behavior as a malicious communication pattern. In some embodiment, the network gateway may request that devices submit a "flight plan" of where/when/how much data a device expects to transmit/receive. The fight plan may be for a predetermined time period or for a given sub-set of devices (e.g., members of a trusted group).

Once a device is assigned a trusted status, the trusted device may communicate with each other trusted devices using pre-determined communication patterns. For example, illustrative communication patterns among members of the trusted group may include a tokenized string, a unique Natural Altered Language ("NAL") or a Specialized Altered Language (SAL). Such communications may be specifically configured to optimize efficiency and security of devices on an IoT network. Using pre-determined communication patterns may make it harder for a compromised target device to intercept messages transmitted among members of the trusted group. Such pre-determined communication patterns, in addition to being encrypted, may use their own language or vocabulary to communicate with other trusted devices.

Trusted devices may also be used to detect compromised target devices. For example, communication among trusted device may be multi-tiered. Each tier may act as a checkpoint for passing communication onto the next tier. If communications received from a target device at a first tier do not conform to an expected format or protocol, the trusted devices in that first tier may warn other trusted devices (and/or untrusted devices) on the IoT that the target device is not following its communication "flight plan" or otherwise poses a security risk.

Apparatus for tracking electronic communication patterns of a target device on a network are provided. The tracked device may be a sensor or another network of sensors or any suitable device. The network may be an IoT. The system may include a trusted group of sensors on the network. The trusted group may include the target sensor.

Each sensor in the trusted group may be configured to join the trusted group by establishing electronic trust with at least one other sensor that is already a member of the trusted group. Each sensor in the trusted group may be configured to monitor activity of the trusteed group and detect when a new sensor attempts to join the group. Each sensor in the trusted group may be configured to identify a terminal member of the trusted group. A terminal member of the trusted group may be defined based on a time each sensor joined the trusted group. For example, the latest (or first) in time sensor to join the group may be designated as the terminal sensor. In some embodiments, each member of the trusted group may be designated as a terminal member for a working period.

A sensor in the trusted group may receive a request from another sensor to join the trusted group. In response to receiving the request, the sensor that received the request may identify a terminal member of the trusted group. The sensor that received the request may direct the requesting to a location of the terminal member. After the handing-off the requesting sensor to the terminal sensor, the terminal sensor may begin a process of adding the requesting sensor to the trusted group.

A process of onboarding the new requesting sensor may include the terminal member establishing electronic trust with the new requesting sensor by monitoring electronic communication patterns generated by the new sensor at a first frequency during an initiation period. The initiation period may be any suitable period of time. After expiration of the initiation period, the terminal member may add the new sensor to the trusted group as a target sensor. A process of adding the new sensor the trusted group may include the terminal member monitoring electronic communication patterns generated by the target sensor at a second frequency during an operational period. The first frequency may be higher than the second frequency.

The terminal sensor may detect that a target sensor exhibits a malicious electronic communication pattern during an initiation period or operational period. In response to detecting the malicious electronic communication pattern, the terminal sensor may initiate an observation period. The observation period may be any suitable period of time. The terminal sensor may erect a silo around the target sensor for at least duration of the observation period.

The silo may restrict communication between the target sensor and other members of the trusted group. For example, the silo may configure members of the target group to follow a predetermined electronic communication pattern when communicating with the target sensor. Such a communication pattern may include limiting communication with target sensor to "read only" and not executing instructions transmitted by the target sensor.

Erecting the silo may include shifting or locking a position of the target sensor within the trusted group. For example, during the observation period, the silo may prevent the target sensor from being the terminal member.

During the observation period, when a malicious electronic communication pattern is exhibited by the target sensor, the terminal sensor may initiate a quarantine period. During the quarantine period, the terminal sensor may reinforce a silo erected around the target sensor. Reinforcing the silo may include configuring other sensors in the trusted group to suspend communication with the target sensor during the quarantine period. Reinforcing the silo may include configuring other sensors in the trusted group to follow a predetermined electronic communication pattern when communicating with the target sensor.

Exemplary predetermined electronic communication patterns may include how often member of the trusted group communicates with the target sensor, how much data members of the trusted group receive from the target sensor during a predefined time period, limiting actions that may be performed by a member of the trusted group in response to a request from the target sensor or any other suitable restriction on how members of the trusted group interact with the target sensor.

After expiration of the operational period without detecting a malicious electronic communication pattern, the target sensor may be allowed to perform duties and functions of a terminal sensor.

In some embodiments, members (e.g., sensors) may be sequentially added to a trusted group. Members of the trusted group may form a chain like architecture. Each sensor may be viewed as a link in the chain and positioned within the chain based on a time the sensor was added to the trusted group. In such embodiments, the terminal sensor may be the sensor added to the trusted group last in time. In such embodiments, the terminal sensor may be the sensor added to the trusted group first in time.

If a terminal sensor adds one or more new sensors and the new sensors are found to be compromised (e.g., exhibit a malicious communication pattern), the new sensors may be unhooked from the chain joining members of the trusted group. All later added sensors connected to the compromised sensor may also be disconnected from the network or decoupled from the trusted group.

Methods for securing communication on an unstructured network are provided. The unstructured network may be an IoT. Methods may secure communication between trusted devices and an untrusted device. Methods may include each of the trusted devices on the network tracking communication and behavior patterns of the untrusted device. Behavior of the untrusted device may include actions taken by other devices on the network in response to instructions provided by the untrusted device. Behavior of the untrusted device may include actions taken the untrusted device itself. The communication and behavior of the untrusted device may be monitored during a monitoring period.

Methods may include polling trusted devices on the network to vouch for integrity of the untrusted device. The polling may occur after an expiration of the monitoring period. Methods may include analyzing responses to the polling. When the analyses of the polling support the integrity of the untrusted device, the untrusted device may be added to the network as a trusted device. Illustrative analyses that may support the integrity of the untrusted device include communication patterns and behavior during the monitoring period that do not include malicious communication patterns.

Methods may include analyzing the responses of the trusted devices by applying a machine learning algorithm. The machine learning algorithm may analyze similarities and/or differences between communication patterns associated with trusted devices to the communication patterns associated with the untrusted device. For example, trusted devices may collectively, exhibit communication patterns that do not include malicious communication patterns. The communication patterns associated with the untrusted device, or historical communication patterns associated with untrusted devices, may be compared to the collective communication patterns generated by the trusted devices. A machine learning algorithm may analyze the communication patterns and attempt to identify whether the untrusted device has exhibited communication patterns that may disrupt data flow or integrity of the network.

Methods may include altering the monitoring period for an untrusted device. For example, a first untrusted device may be monitored for x minutes and second untrusted device may be monitored for y minutes. Altering the monitoring period may make it more difficult for an untrusted device to know when a malicious communication pattern will be detected by the trusted devices. The monitoring period may be randomly altered.

Methods may include adding an untrusted device to the network in a sequential position. The sequential positon may correspond to duration of time each trusted device has been connected to the network as a trusted device. The sequential positon may correspond to duration of the monitoring period associated with the device. The sequential positon may correspond to a geographic location of each trusted device.

The sequential positon may correspond to proximity of each trusted device to a known geographic location. For example, trusted devices may be expected to reside with a pre-determined radius of an owner/operator of the trusted devices. Such a pre-determined radius may be based on a location where the device owner/operator lives, works or any other suitable criteria.

The sequential positon may correspond to proximity of each trusted device to a central node on the network. For example, multiple devices may each connect to a mobile device (e.g., smartphone of an owner of the trusted devices).

Methods may include weighting responses to the polling of each trusted devices based on their sequential positions. For example, the further a device is located from the central node and/or device owner location, the less weight may be attributed to its polling response. Polling responses of devices that are more frequently accesses by the owner (e.g., smart watch, automobile, automated teller machine) may be assigned a higher weight. The polling response of a device recently assigned a trusted status may be assigned less weight than the polling response of a device that has maintained a trusted status for a longer period of time.

Methods may include detecting compromised behavior of a trusted device. For example, one or more trusted devices on the network may monitor behavior or communication patterns of other trusted devices. Each trusted device on the network may be assigned at least one "buddy" node that is responsible for monitoring behavior of the trusted device. In response to detecting compromised behavior of a trusted device, the trusted device may be reclassified as a target device or a compromised target device.

Methods may include erecting a silo around a compromised target device. Erecting the silo may include unhooking the compromised device from other trusted devices. Erecting the silo may include discounting any response received from the compromised target device in response to the polling. Discounting the polling response may include assigning the polling response less weight (or no weight) than polling responses received from other devices.

Methods may include discounting a polling response received from a trusted device that served as a destination for data transmitted by a compromised target device. Methods may include discounting a polling response received from a trusted device that served as a source for data transmitted and/or destined for a compromised target device.

Methods may include, initiating a quarantine period after a monitoring period. Methods may include, after expiration the quarantine period, banning the compromised target device from accessing the network. Banning the compromised target device may include blacklisting a physical address associated with the compromised target device. Blacklisted addresses may not be allowed to join the network or transmit/receive communications using the network.

If, during the quarantine period the compromised device target exhibits expected communication patterns, methods may include reinstating a trusted status of the compromised target device.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative system architecture 100. Architecture 100 may represent an internet of things ("IoT"). A differentiator between IoT and conventional networks may include a traffic profile. In an IoT, nodes may not have defined or known network positions, communication protocols or security services. Solutions that allow architecture 100 to function seamlessly despite functional and operational differences among nodes are disclosed herein.

Architecture 100 may include one or more nodes. Each node may include two or more nodes. FIG. 1 shows exemplary nodes 101, 103, 105, 107 and 109. Architecture 100 includes sensors 103. Sensors 103 may include devices that detect changes in a physical or virtual environment. For example sensors may measure audio, rainfall, temperature or water levels. Sensors may measure electronic network traffic, electronic signals (e.g., input or output) or frequency of user logins within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smartphones, jewelry or refrigerators. Sensors may be relatively inexpensive and have low energy consumption. Sensors may "sense" two or more stimuli or environmental changes.

Sensors may implement two or more functions. For example, sensors may measure changes in their native (physical or virtual) environment, capture data corresponding to the measured changes and store/communicate the captured data. Sensors may be accessed by other sensors or any other node. Sensors may transmit captured data to another node. Sensors may broadcast captured data to two or more nodes.

Captured data may be transmitted using any suitable transmission method. For example, data captured by a sensor may be extracted by a smartphone. Sensors may leverage a communication link provided by a smartphone to communicate captured data to another node.

Each sensor may be a node and each sensor may be assigned a unique identifier. For example, sensors may be identified by one or more radio frequency identification ("RFID") tags. The RFID tag may be stimulated to transmit identity information about the sensor or any other information stored on the RFID tag.

Data captured by a sensor may be transmitted by the sensor and processed far from the location where the data was captured. For example, captured data may be transmitted from one node to another node until the captured data reaches data repository 101.

Sensors maybe positioned and capture data from diverse locations. Locations may include geographic locations or virtual locations on electronic networks. Captured data may be transmitted to a location where information is needed for decisioning or consumption. Such a location may not be the same place the data was captured or generated. Data synchronization protocols and caching techniques may be deployed to ensure availability of information at, or delivery to, a desired node. For example, a location where data is captured may not have continuous, reliable network connectivity. Accordingly, captured data may be stored locally on the sensor for an amount of time until a network connection is available to transmit or broadcast the captured data to another node.

Sensors may be grouped. Sensors may be grouped based on physical proximity or based on the content (or expected content) of data captured. Sensors may be grouped virtually. Other nodes, such as data analysis engine 109 may create and/or be included in such groups. In some embodiments, the captured data may be organized by data repository 101.

Contextually, captured data may provide information not only about the native (physical or virtual) environment surrounding a sensor, but the capturing of data from multiple sensors may provide data that signifies occurrence an event. Detecting the occurrence of the event may trigger sensors to take responsive action.

For example, based on data captured from sensors 103, actuators 107 may respond to a detected event. Based on the capture and analysis of multiple sources of data, actuators 107 may be instructed to take action without human intervention.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable (e.g., logical) operation.

A node may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a node may be linked by a system bus, wirelessly or by other interconnections. Node components may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 1, a node may operate in a networked environment. A node may be part of two or more networks. A node may support establishing network connections to one or more remote nodes. Such remote nodes may be sensors, actuators or other computing devices. Nodes may be personal computers or servers. Network connections may include a local area network ("LAN") and a wide area network ("WAN"), and may also include other networks. When used in a LAN networking environment, a node may be connected to the LAN through a network interface or adapter. A node may include a communication circuit. The communication circuit may include the network interface or adapter.

When used in a WAN networking environment, a node may include a modem, antenna or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a battery, speaker, and antennas. Network nodes may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing nodes that consume less power for their basic functionality and allow any residual power to provide enhanced security and functionality. Illustrative devices that may be constructed using OLED technology are disclosed in commonly assigned U.S. Pat. No. 9,665,818, which is hereby incorporated by reference herein in its entirety.

A node may be operational with numerous other general purpose or special purpose computing system environments or configurations. Examples of well-known computing systems, environments, and/or configurations that may be suitable for use with the disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, executed by a processor. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that power one or more components of a node.

Sensors in architecture 100 or other grouping may be produced by different manufacturers. Sensors may capture data in different formats. For example, sensors may use different data structures to package captured data. Sensors 103 may utilize different communication protocols to transmit captured data or communicate with other nodes. Despite such operational differences, nodes of architecture 100 may be configured to operate substantially seamlessly together. Interoperability may allow captured data to be substantially seamlessly captured and interpreted by data analysis engine 109. Based on interpreting the captured data, data analysis engine 109 may issue instructions to actuators 107.

Interoperability may be implemented across any suitable nodes of architecture 100. Interoperability may enable communication between sensors 103 and other nodes. Interoperability may enable architecture 100 to provide services and applications via actuators 107. Interoperability may allow services and content to be provided anywhere, anytime and based on input/output of different nodes.

Data gathering by one or more of sensors 103 may be controlled by one or more other nodes of architecture 100. For example, data analysis engine 109 may control a quantity of data captured by sensors 103. Alternatively, data repository 101 and/or analysis engine 109 may filter or otherwise intelligently process data captured by sensors 103.

Timing of when data is captured by sensors 103 may be controlled by any suitable node on architecture 100. For example, data may be captured in real-time or at pre-defined intervals such as once a day. Data may also be captured in response to a detected environmental status change.

Data analysis engine 109 may filter data captured by sensors 103. Data analysis engine 103 may repackage or reformat captured data. Data conversion may include transformation of low level raw data (possibly from multiple sensors or groups of sensors) into meaningful information for a target audience or for a target analysis.

For example, captured data intended for human consumption or interaction may be converted into a human understandable format. Captured data intended for machine consumption may be converted into a format readable by a particular machine or node.

Data analysis engine 109 may perform pattern recognition to identify correlations and trends in captured data. Data analysis engine 109 may also evaluate a cost of obtaining data. "Costs" may be monetary (e.g., labor costs or infrastructure costs), time-related or related to a level of intrusion needed to obtain desired data.

"Costs" may be bandwidth-related. For example, a communication link may be associated with a fixed bandwidth. The bandwidth may limit an amount of information or a rate of transmission over the communication link. As further example, a sensor may respond slowly to a request from another node if there is a large amount of informational traffic traveling on a communication link shared with other nodes. The large amount of informational traffic may not leave sufficient bandwidth for the transmitting node to timely communicate with the requesting node.

As a further example, a sensor may respond slowly if the sensor transmits a large amount of captured data. If transmitted all at once, the large amount of information transmitted by the sensor, together with other informational traffic traveling on the shared communication link, may be close to, or exceed the bandwidth of the communication link. As a result, sensors may be unable to transmit captured date in a timely manner.

Data travelling within architecture 100 to/from nodes may be routed along multiple communication links until the transmitted information reaches a desired destination node (e.g., data analysis engine 109). Each communication link may service a number of connected nodes and a respective volume of informational traffic.

It may be difficult to ascertain available bandwidth on a particular communication link. It may be difficult to ascertain which communication links are being utilized to transmit information between nodes. Nodes attempting to transmit information over a communication link may not be aware of a number of connected nodes, a volume of traffic on a particular communication link or a bandwidth capacity of a communication link.

Furthermore, a communication link may be controlled by a different entity from an entity responsible for operation of a particular node. The entity responsible for operation of the node may be unable to monitor a number of nodes that share a communication link, a bandwidth capacity of a communication link or a volume of traffic transmitted on a communication link. Despite difficult to predict conditions on a communication link, it would be desirable for a node to timely respond to a request for information or timely receive desired information.

Sensors 103 may belong to, or operated by, different administrative/management domains. Sensors 103 may be operated by different domains without expressly-defined relationships among such domains. The absence of express relationships may enhance access to data captured by sensors 103 by one or more architectures having one or more features in common with architecture 100. Groups of sensors may include sensors from two or more administrative domains.

Data repository 101 may receive data captured by sensors 103. In some embodiments, data captured by sensors 103 may be transmitted directly to data analysis engine 109. Data stored in repository 101 may be sorted and analyzed by data analysis engine 109. Data stored in data repository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may optimize processes, reduce loss (e.g., fraud), improve customer understanding and targeting, increase automation, decrease latency in products and/or services provided by actuators 107 and identify new analytical models that may utilize data captured by sensors 103.

Architecture 100 may include one or more layers of software applications. Software applications may implement a variety of functions and provide varied services to nodes of architecture 100. Software applications running on data analysis engine 109 may submit requests to sensors 103 for retrieval of specific data to achieve a functional goal provided by actuators 107. Software applications may control data captured by sensors 103 or actions taken by actuators 107. Software applications may control a flow of information within architecture 100.

Software applications may be implemented on a node. A node may be an enterprise system or a "cloud" or "fog" of computing devices. On-device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as sensors (e.g., to achieve a target functionality). Middleware may be responsible for aggregating data captured by sensors 103 and passing captured data to data repository 101 and/or data analysis engine 109.

Software applications may provide security services that mitigate threats to the integrity of data captured by sensors 103 or architecture 100 generally.

Actuators 107 may respond to data transmitted or processed by other nodes such as data analysis engine 109. Actuators 107 may include devices that modify the physical state of a physical entity. Actuators 107 may include devices that modify a virtual state of information. Actuators 107 may move (translate, rotate, etc.) physical objects or activate/deactivate functionalities of physical objects. For example, actuators 107 may dim a light bulb, open a door, change a temperature setting, authorize access to an automated-teller-machine ("ATM") and/or any other suitable functionality. Actuators 107 may verify identities, trigger electronic payments, extend credit or debit accounts.

Within an intelligent networked system such as architecture 100, sensors 103 perform the functions of input devices—they serve as "eyes" collecting information about their native environment. In contrast, actuators 107 act as "hands" implementing decisions based on data captured by sensors 103. A single node may include the functions of sensors and actuators.

Actuators 107 may communicate with data analysis engine 109 and sensors 103. Actuators 107 may include an application programming interface ("API") for communicating with other nodes. Actuators 107 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision-making and communication processes for actuators 107.

Generally, nodes on a network may interact and cooperate using one or more interaction paradigms. Exemplary interaction paradigms include client-server and peer-to-peer interactions. However, an IoT may not include express or clearly defined relationships between sensors and the devices that access data captured by the sensors. Therefore, traditional approaches for managing trust, security naming, discovery, or other traditional network services may not be applicable or available.

As a result of the disparate nature of sensors 103, an architecture, such as architecture 100 incorporating sensors 103 may support a variety of communication protocols. Illustrative supported protocols may include HyperText Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols. For example, ZigBee is particularly useful for low-power transmission and requires approximately 20 to 60 milliwatts ("mW") for 1 mW transmission power over a range of 10 to 100 meters and a data transmission rate of 250 kilobits per second.

To further conserve energy, a sensor may communicate wirelessly for short periods of time. Utilizing this approach, one or more standard size single cell cylindrical dry battery batteries (e.g., AA size) may provide a node with requisite computing power and wireless communication for many months.

Communication protocols used by nodes (e.g., sensors or actuators) may not have, or may not be capable of having, security capabilities. A security layer or buffer may be implemented by nodes that receive or rely on data captured by unsecured sensors. Sensors or other nodes may be dynamically connected or disconnected from a group or architecture. A security layer or buffer may be modular and quickly scalable meet node growth/contraction requirements.

A physical layer may link nodes of architecture 100. The physical layer may provide communication pathways to move data between multiple sub-networks and nodes. Such communication pathways may be wired or wireless. Exemplary wireless communication pathways may include Bluetooth, Wi-Fi, 3G and 4G and LTE.

Figure 2:
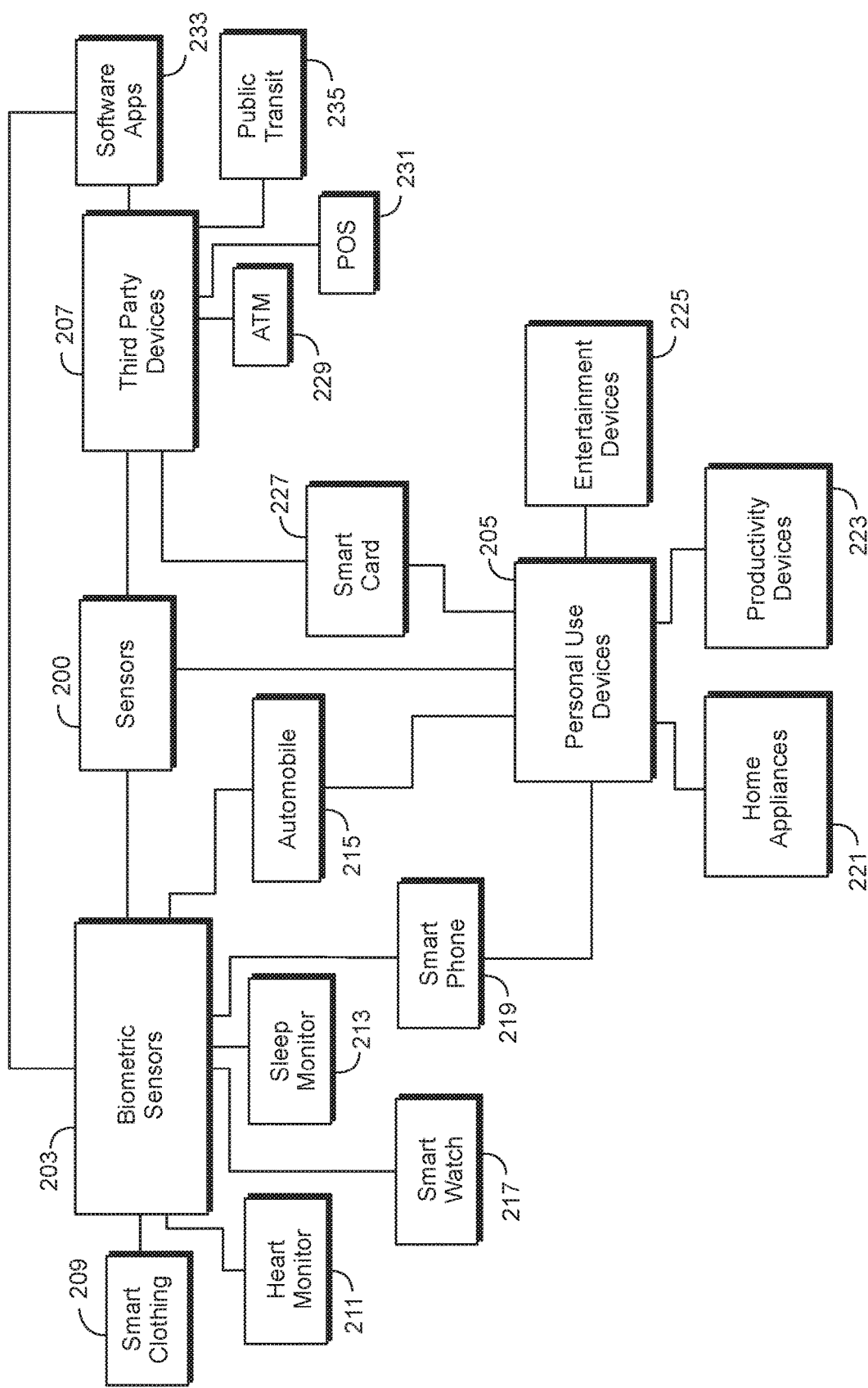
FIG. 2 shows an illustrative arrangement of interconnected sensors in accordance with principles of the disclosure.

FIG. 2 shows illustrative sensors 200. Sensors 200 may include one or more features of sensors 103 (shown in FIG. 1). Sensors 200 include biometric sensors 203 that sense biometric attributes. For example, biometric sensors may be embedded in "smart" clothing 209 that monitor a wearer's physical condition. Such clothing may capture biometric data, such as pulse rate, temperature, perspiration levels, muscle contraction, heart rhythm and/or physical movement. Smart clothing may be linked to smart phone 219 such as via a Bluetooth® communication link. Smart phone 219 may transmit data captured by smart clothing 209 to one or more other network nodes.

Biometric sensors 203 may include other illustrative sensors such as heart monitor 211, sleep monitor 213, smart watch 217, smart phone 219 and automobile 215.

Sensors 200 may include personal use devices 205. Personal use devices 205 may include sensors embedded in home appliances 221, productivity devices 223 or entertainment devices 225. Productivity devices 223 may include tablets, laptops or other personal computing devices. Entertainment devices may include gaming consoles and the like.

Sensors 200 also include third-party devices 207. Third-party devices may include devices that are not under the direct or exclusive control of a user. Third-party devices may include devices whose use is monitored by a third-party. A user may interact with third-party devices 207 to obtain a desired service provided by the third-party.

Exemplary third party devices include smart card 227. Smart card 227 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Illustrative purchasing instruments may include a credit card, debit card and other electronic purchasing devices. Such purchasing instruments may sense a location or frequency of use.

Purchasing instruments may include "EMV" chips. EMV is a technology that derives its name from the companies (Europay, MasterCard, and Visa) that developed the technology standard. When a purchasing instrument and its associated EMV chip are inserted into a specialized card reader such as point-of-sale terminal ("POS") 231, the reader powers the EMV chip and the EMV chip generates a new authorization code each time the purchasing instrument is used. The EMV chip may capture transaction data such as transaction amount, transaction location or identity of the POS.

Third-party sensors 207 include ATM 229, POS 231 and public transit 235. ATM 229 and POS 231 may also be actuators. Third-party devices may also include software applications 233. Applications 233 may be used to access services, such as an online banking portal ("OLB"). Such applications may detect and validate biometric features submitted to gain access to an OLB. Third-party devices 207 may include sensors that capture data associated with power consumption (e.g., smart grids), electronic communication traffic, logistics (package movement) or any other suitable environmental condition.

FIG. 200 shows that sensors may categorically overlap. For example, software application 233 used to access an OLB may interact with biometric sensors 203 (e.g., fingerprint reader) to authenticate a user. Automobile 215 may be in regular communication with personal use devices 215 and biometric sensors 203.

Each of the sensors shown in FIG. 200 may include different and possibly incompatible hardware. For example, sensors may each have different operating systems (or none at all), processor types and memory requirements. Sensors 200 may be inexpensive, single-function devices with rudimentary network connectivity. Sensors 200 may be positioned in remote and/or inaccessible locations where human intervention or configuration is difficult.

To conserve power, sensors 200 may utilize 16-bit microcontrollers. Such microcontrollers may use less than 400 microwatts ("µW") per MIPS ("million instructions per second") and may be capable of operating TCP/IPv6 stacks with 4 kB RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication protocols or other suitable communication protocols.

Furthermore, because of potentially disparate and incompatible features of sensors 200, security solutions disclosed herein may be used to verify an authenticity of a sensor and/or data transmitted by the sensor.

Figure 3:
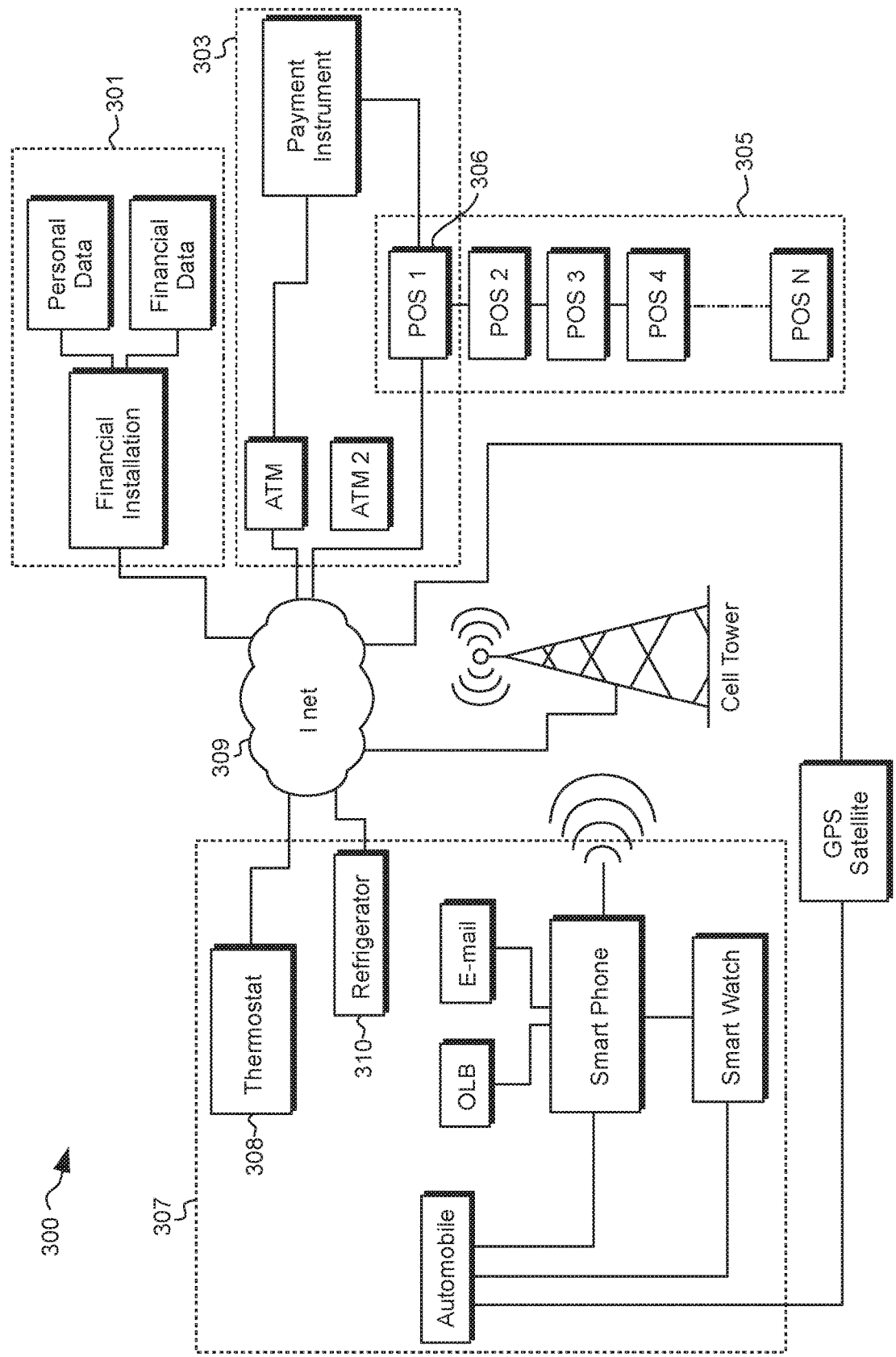
FIG. 3 shows an illustrative arrangement of interconnected sensors in accordance with principles of the disclosure.

FIG. 3 shows illustrative sensor arrangement 300. Arrangement 300 includes trusted group 301. Trusted group 301 includes sensors that have established a trusted relationship with each other. A sensor that is a member of a group 301 may not be a trusted member of a different group. For example, a sensor that is a member of group 301 may not be a trusted member of group 307. A member of group 307 may be added (e.g., by a terminal sensor) as a trusted member of group 301.

Arrangement 300 includes groups 303 and 305. Sensor 306 is a node in group 303 and group 305. Other nodes of group 305 may be considered "untrusted" by nodes of trusted group 303. Arrangement 300 includes group 307. Group 307 includes nodes 308 and 310 that are not directly connected to each other or directly connected to other nodes of group 307.

Collectively, nodes of one group may be a "target node" with respect to another group. One or more nodes of a group may be configured to monitor electronic communication patterns generated by one or more nodes of another group. To access a first group, a node of a second group may be directed to a node of the first group. The node of the first group may monitor communication patterns associated with information flowing to/from nodes of the second group. The node of the first group may determine whether the electronic communication patterns associated with nodes in the second group include a malicious communication pattern.

For example, nodes in group 307 may be trusted with respect to each other. Nodes in group 303 may be trusted with respect to each other. Nodes in group 303 may be trusted with respect to nodes in group 301. However, nodes of group 307 may be untrusted with respect to nodes of groups 301, 303 or 305.

When one or more nodes of group 307 initiate communication with one or more nodes of group 301, at least one node of group 303 may monitor communications patterns transmitted to and/or received from nodes of group 307. Thus, a node of group 303 may act as a reverse proxy to monitor communications between nodes of group 301 and nodes of group 307. For example, nodes of group 303 may request data captured by one or more nodes in group 307. Such data may be leveraged to authenticate a customer at a node of group 303 such as an automated teller machine ("ATM"). Such data may be leveraged to complete a transaction at a node of group 305, such as a point-of-sale ("POS") terminal.

A node of group 303, when acting as a reverse proxy on behalf of group 307, may dedicate communication pathways within group 303 to transfer information between nodes of group 301 and nodes of group 307. When acting as a reverse proxy, a node of group 303 may assign other nodes within group 303 to interface with nodes of group 301 and/or group 307.

When acting as a reverse proxy, a node of group 303 may operate in specially designed hardware of software modes. For example, when fulfilling reverse proxy duties, a node of group 303 may subject nodes of group 307 to more frequent checks for malicious communication patterns. When group 303 communicates with a group that is trusted by nodes of group 303, group 303 may suspend monitoring of group 307 and associated reverse proxy operations.

When group 303 is disconnected from group 307 and communicates with its own trusted nodes, group 303 may operate in a manner that prioritizes speedy inter-node information transfer over detailed analysis of inter-node communication patterns. When group 303 is disconnected from group 307, group 303 may suspend specially designed hardware and/or software modes. Suspending reverse proxy duties may reduce power consumption of nodes within group 303. Suspending reverse proxy duties may increase inter-node transmission rates among nodes of group 303.

Figure 4:
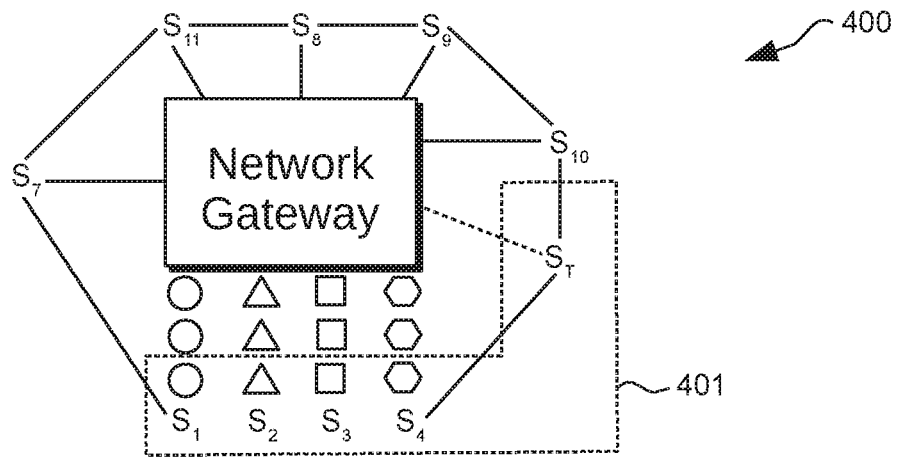
FIG. 4 shows an illustrative arrangement of interconnected sensors in accordance with principles of the disclosure.

FIG. 4 shows illustrative arrangement 400. Arrangement 400 includes sensors $S_1$, $S_2$, $S_3$, $S_4$, $S_7$, $S_{11}$, $S_8$, $S_9$, $S_{10}$ and $S_T$. The sensors may be any suitable sensors, such as sensors shown in FIGS. 1-3.

Arrangement 400 includes trusted group 401. Trusted group 401 includes sensors $S_1$, $S_2$, $S_3$ and $S_4$. Sensor $S_T$ may correspond to a target sensor that is requesting to join trusted group 401. Sensor $S_T$ may correspond to a target sensor that is a member of trusted group 401 and is being monitored by other members (e.g., $S_1$, $S_2$, $S_3$ and/or $S_4$) of trusted group 401.

FIG. 4 shows that each of sensors $S_1$, $S_2$, $S_3$ and $S_4$ have established defined communication patterns with network gateway 403. Network gateway 403 may be a trusted sensor/member of trusted group 401. For example, sensor $S_1$ exhibits a communication pattern represented by the symbol "O." In other embodiments (not shown) such defined communication patterns may be established among two or more sensors and such communication patterns may or may not involve network gateway 403. Deviation from an established communication pattern may be considered a malicious communication pattern.

Figure 5:
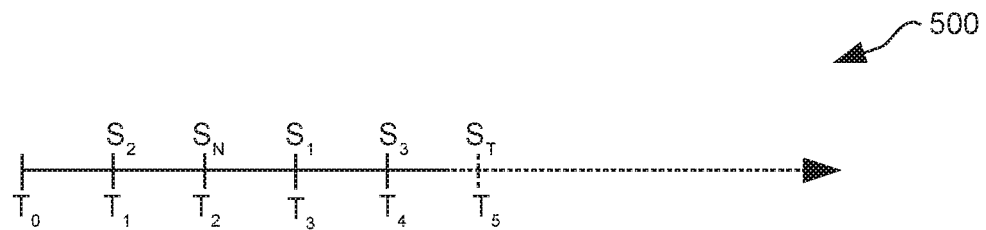
FIG. 5 shows illustrative information in accordance with principles of the disclosure.

FIG. 5 shows illustrative timeline 500. Timeline 500 shows when each member of trusted group 401 (shown in FIG. 4) was as added to the trusted group. A time each sensor was added to the group may correspond to a sequential position of each sensor within the trusted group.

Timeline 500 also shows that an application to add sensor $S_T$ at time $T_5$ (shown in broken line) is currently pending.

Figure 6:
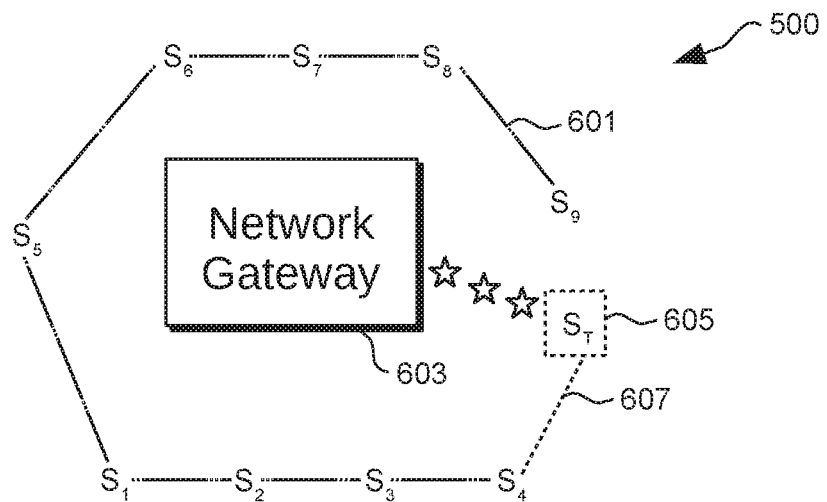
FIG. 6 shows an illustrative arrangement of interconnected sensors in accordance with principles of the disclosure.

FIG. 6 shows illustrative arrangement 600. Arrangement 600 includes trusted group 601. Trusted group 601 includes sensors $S_1$-$S_9$. Arrangement 600 includes target sensor $S_T$. Target sensor $S_T$ may have been a trusted member of trusted group 601 but exhibited a malicious communication pattern. In response to detecting the malicious communication pattern, silo 605 has been erected around $S_T$. FIG. 6 shows that because silo 605 has been erected around $S_T$, unlike the other sensors in trusted group 601, $S_T$ must communicate directly with network gateway 603. $S_T$ may be required to communication directly with network gateway during an observation period and/or during a quarantine period. Prior to erecting silo 605, $S_T$ may have been allowed to utilized communication pathway 607.

Figure 7:
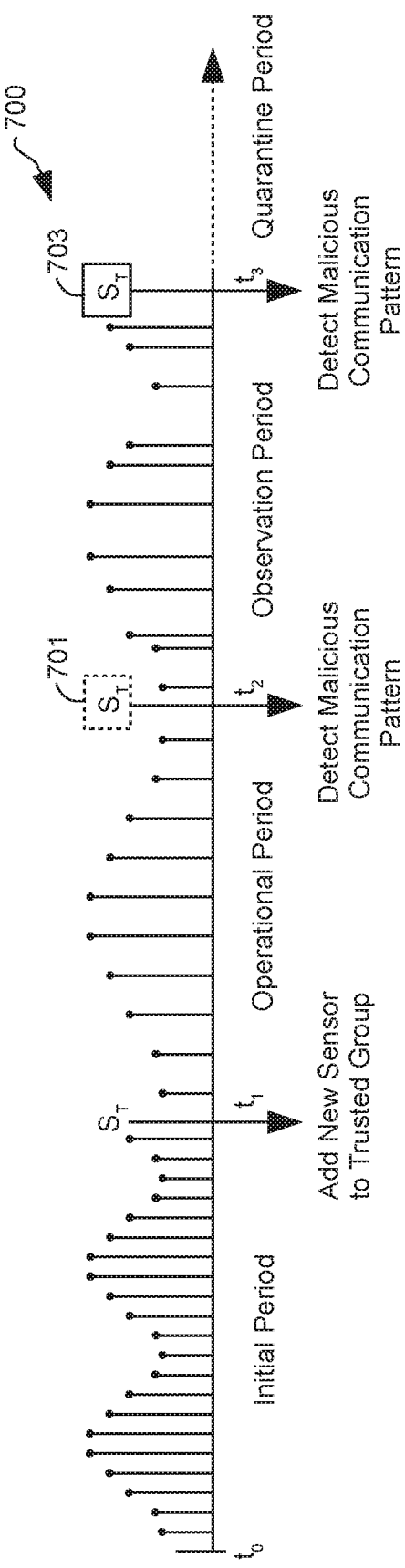
FIG. 7 shows an illustrative process in accordance with principles of the disclosure.

FIG. 7 shows illustrative monitoring sequence 700. One or more of the steps of the process illustrated in FIG. 7 may be performed by any suitable device. For example, one or more steps of process 700 may be performed by devices shown in FIGS. 1-3.

Sequence 700 begins at $t_0$. At $t_0$, one or more sensors in a trusted group begin monitoring behavior and/or communication patterns of a target sensor, $S_T$. Target sensor $S_T$ may be a member of the trusted group. Target sensor $S_T$ may not yet be a member of the trusted group. Target sensor $S_T$ may have submitted a request to become a member of the trusted group.

During an initial monitoring period, trusted sensors (e.g., members of a trusted group) monitoring target sensor $S_T$ may monitor communication patterns of $S_T$ at a first frequency. The communication patterns of $S_T$ may be monitored at the first frequency from $t_0$ until $t_1$.

At $t_1$, target sensor $S_T$ may be added to a trusted group. $S_T$ may be added to the trusted group if no malicious communication patterns are detected during the initial monitoring period $t_0$-$t_1$. After target sensor $S_T$ is added as a member of the trusted group, the communication patterns exhibited by $S_T$ may be monitored at a second frequency during operational period $t_1$-$t_2$. The first frequency may be higher than the second frequency.

For example, the communication patterns exhibited by $S_T$ may be monitored more closely before $S_T$ is added to the trusted group. In some embodiments, the communication patterns exhibited by $S_T$ may be monitored more closely after $S_T$ is added to the trusted group.

At $t_2$, a member of the trusted group may detect that $S_T$ exhibited a malicious communication pattern. In some embodiments, malicious communication patterns may be detected by a sensor that is not a member of a trusted group. When a malicious communication pattern is detected by a sensor that is not a member of the trusted group, such detection may be transmitted to a network gateway associated with the trusted group or other node(s) designated for receiving such information. In some embodiments, detection of a malicious communication may be broadcast to all members of the trusted group.

Upon detection of the malicious communication pattern at $t_2$, an observation period is initiated. During the observation period, communication patterns exhibited by $S_T$ may be monitored at a third frequency. The third frequency may include random checks on communication activity of target sensor $S_T$. The third frequency may be higher or lower than the frequency associated with the initial period or operational period.

After detection of the malicious communication pattern at $t_2$, silo 701 is erected around target sensor $S_T$. Silo 701 may restrict communication between target sensor $S_T$ and other members of the trusted group. For example, all members of the target group may be constrained to follow a predetermined electronic communication pattern when interacting with target sensor $S_T$.

Erecting silo 701 may trigger shifting a position of target sensor $S_T$ within the trusted group. For example, the position of target sensor $S_T$ may be shifted such that $S_T$ is not (or may not be) a terminal member during the observation period.

Sequence 700 shows that at $t_3$, another malicious communication pattern is exhibited by target sensor $S_T$. In response to detection of the malicious communication pattern at $t_3$, silo 701 is reinforced to provide silo 703. Silo 703 may prevent other sensors in the trusted group from communicating with target sensor $S_T$. Silo 703 may include configuring each of the other sensors in the trusted group to relay electronic communications received from target sensor $S_T$ to one or more devices outside the trusted group without executing any computer executable code received from target sensor $S_T$. Silo 703 may correspond to revoking a trusted status of target sensor $S_T$.

After $t_3$, a quarantine period is initiated. Silo 703 may remain in force for duration of the quarantine period. The quarantine period may never expire. Duration of the quarantine period may correspond to duration of the initial period. For example, if silo 703 is erected, target sensor may need to reapply to join the trusted group.

Figure 8:
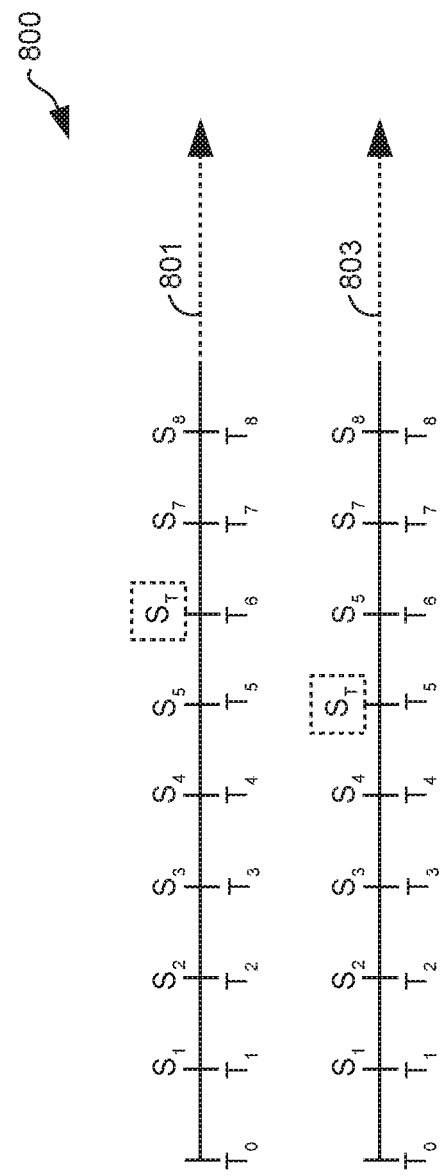
FIG. 8 shows an illustrative process in accordance with principles of the disclosure.

FIG. 8 shows illustrative sensor positions 800. Sensor positions 800 may be associated with members of a trusted group. Sensor positions may be based on a time each sensor joins the trusted group. Sensor positions 800 may be based on geographic location of each sensor in the trusted group. Sensor positions 800 may be based on an assigned time-window for transmitting and/or receiving information to/from one or more other sensors.

Sensor positions 800 include initial sensor positions 801. Initial sensor positions 801 may be based on a time each sensor joins a trusted group. Initial sensor positions 801 shows that sensor $S_T$ initially occupies position $t_6$.

Sensor positions 800 include shifted sensor positions 803. Shifted sensor positions 803 shows that sensor $S_T$ has been shifted from position $t_6$ to position $t_5$. A position of sensor $S_T$ may be shifted in response to detecting that sensor $S_T$ has exhibited a malicious communication pattern. A position of sensor $S_T$ may be shifted in response to erecting a silo (such as silos 701 or 703 shown in FIG. 7) around sensor $S_T$.

Thus, apparatus and methods for a smart IoT web of trust are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A system for tracking communication behavior of a target sensor on an Internet-of-Things ("IoT") network, the system comprising:
   a trusted group of sensors on the network, the trusted group comprising a target sensor; and
   a network gateway with memory configured to:

track a position of the target sensor on the network, wherein the position is defined based a time the target joined the trusted group;
add one or more untrusted sensors to the trusted group;
monitor electronic communication patterns among the sensors in the trusted group;
detect an electronic communication pattern exhibited by the target sensor that corresponds to a malicious communication pattern;
in response to detecting the malicious communication pattern, shift the position of the target sensor within the trusted group;
initiate an observation period after shifting the position of the target sensor;
during the observation period, monitor electronic communication patterns generated by the target sensor;
during the observation period, when the monitored electronic communication patterns associated with the target sensor include the malicious communication pattern:
  initiate a quarantine period; and
  erect a silo around the target sensor such that other sensors in the trusted group, during the quarantine period, exhibit a predetermined electronic communication pattern when interacting with the target sensor;
configure the sensors in the trusted group such that during the quarantine period, the network gateway is the sole source, on behalf of the trusted group, of electronic communication with the target sensor; and
after expiration of the quarantine period:
  determine whether the target sensor exhibited the malicious electronic communication pattern during the quarantine period; and
  when the target sensor exhibited the malicious communication pattern at least once during the quarantine period, disconnect the target sensor from the network.

2. The system of claim 1 wherein the network gateway erects the silo around the target sensor by configuring each of the other sensors in the trusted group to relay electronic communications received from the target sensor to one or more devices outside the trusted group without executing any computer executable code received from the target sensor.

3. The system of claim 1, wherein the network gateway erects the silo around the target sensor by configuring sensors in the trusted group such that the target sensor cannot transfer or receive electronic communications to/from any of the sensors in the trusted group.

4. The system of claim 1 wherein erecting the silo around the target sensor suspends a trusted status of the target sensor.

5. The system of claim 4, the network gateway, after expiration of the quarantine period:
  determines that the target sensor did not exhibit the malicious electronic communication pattern at least once during the quarantine period;
  deconstructs the silo erected around the target sensor; and
  reassigns the trusted status to the target sensor.

6. The system of claim 1 wherein the electronic communication pattern is established based on electronic communication among three of more sensors in the group for a predetermined time period.

7. The system of claim 1, the network comprising an untrusted sensor, wherein the network gateway is configured to add the untrusted sensor to the trusted group based on electronic communication patterns between the untrusted sensor and at least one sensor in the trusted group.

8. A system for tracking electronic communication patterns of a target sensor on a network, the system comprising a trusted group of sensors on the network, the trusted group comprising the target sensor, wherein each sensor in the trusted group is configured to:
  join the trusted group by establishing electronic trust with at least one other sensor already a member of the trusted group;
  detect a new sensor that requests to joins the trusted group;
  identify a terminal member of the trusted group; and
  in response to identifying the terminal sensor, transferring control of establishing electronic trust with the new sensor to the terminal member;
wherein, the terminal member:
  establishes electronic trust with the new sensor by monitoring electronic communication patterns generated by the new sensor at a first frequency during an initiation period;
  after expiration of the initiation period:
    adds the new sensor to the trusted group as the target sensor;
    monitors electronic communication patterns generated by the target sensor at a second frequency during an operational period;
    detects that the target sensor exhibits a malicious electronic communication pattern;
    in response to detecting the malicious electronic communication pattern, initiates an observation period; and
    erects a silo around the target sensor for at least a duration of the observation period, wherein the silo restricts communication between the target sensor and all other members of the trusted group, such that all members of the trusted group exhibit a predetermined electronic communication pattern when interacting with the target sensor; and
  when the target sensor exhibits the malicious electronic communication pattern during the observation period, the terminal sensor:
    initiates a quarantine period; and
    reinforces the silo erected around the target sensor such that other sensors in the trusted group, during the quarantine period, do not communicate with the target sensor.

9. The system of claim 8 wherein erecting the silo comprises shifting a position of the target sensor within the trusted group such that the target sensor is not the terminal member during the observation period.

10. The system of claim 8 wherein each member of the trusted group is the terminal member for a working period.

11. The system of claim 8, wherein electronic trust is established with the new sensor based on applying a machine learning algorithm to the electronic communication patterns generated by the new sensor.

12. The system of claim 11, wherein the machine learning algorithm learns based on associating electronic communication patterns with actions triggered by the electronic communication patterns.

13. The system of claim 8, wherein after expiration of the operational period without detecting the malicious electronic communication pattern, the target sensor is allowed to be the terminal sensor.

14. A method for securing communication on an unstructured network between trusted devices and an untrusted device, the method comprising:
- during a monitoring period, each of the trusted devices on the network tracking:
  - communication and behavior patterns of the untrusted device at a first frequency;
  - a position of the untrusted device on the network, wherein the position is defined based a time the untrusted device joined the network;
- polling the trusted devices on the network to vouch for an integrity of the untrusted device;
- analyzing the polling responses;
- when the analyses supports the integrity of the untrusted device, adding the untrusted device to the network as a target trusted device; and
- after the adding:
  - assigning at least one of the trusted devices on the network to monitor communication and behavior patterns of the target trusted device at a second frequency;
  - detecting a malicious communication pattern exhibited by the target trusted device; and
  - in response to detecting the malicious communication pattern:
    - erecting a silo around the target trusted device;
    - shifting the position of the target trusted device on the network;
    - after the shifting, initiating a quarantine period; and
    - when the target sensor exhibits the malicious communication pattern at least once during the quarantine period, disconnecting the target trusted device from the network.

15. The method of claim 14 further comprising:
- analyzing the polling responses of the trusted devices by applying a machine learning algorithm that matches communication patterns associated with the trusted devices to the communication patterns associated with the untrusted device;

wherein, the machine learning algorithm discounts the polling response received from:
- at least one of the trusted devices that served as a destination for data transmitted by the target trusted device; or
- at least one of the trusted devices that served as a source for data transmitted and destined for the target trusted device.

16. The method of claim 14 further comprising adding the untrusted device to the network as the target trusted device in a sequential position that corresponds to a duration of time each of the trusted devices has been connected to the network.

* * * * *